United States Patent Office 3,686,051
Patented Aug. 22, 1972

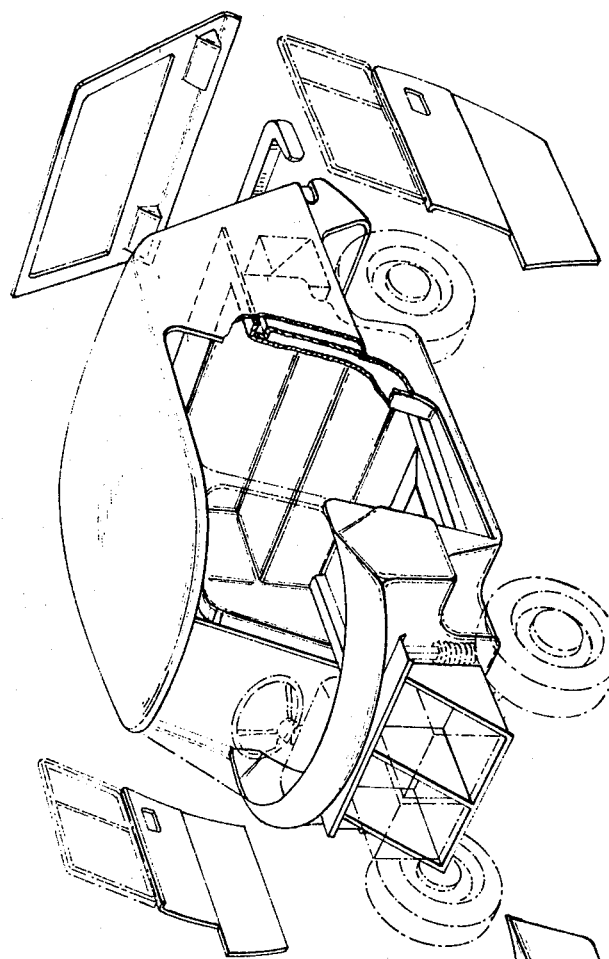
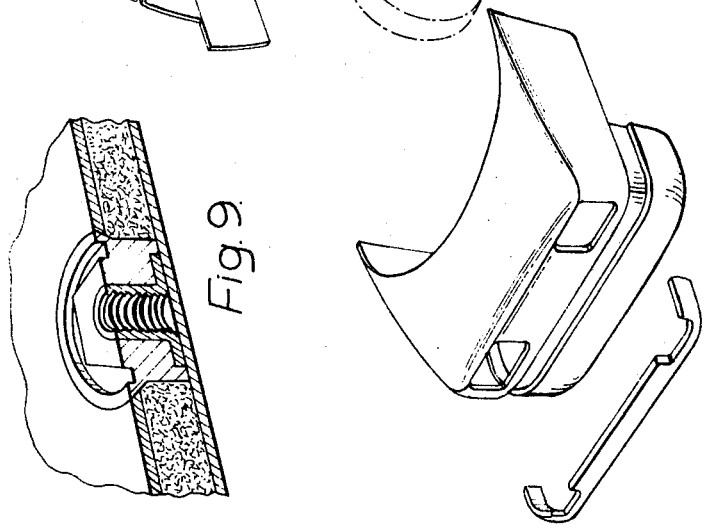

3,686,051
METHOD OF MAKING LAMINATED MOTOR LAND VEHICLE BODY
Jon Michael Glen Samuel, Cobham, and James Earl Rawlings, New Malden, England, assignors to Diva Cars Limited, trading as Enfield Automotive, London, England
Filed Oct. 7, 1969, Ser. No. 864,410
Int. Cl. B29c *17/04*
U.S. Cl. 156—212
3 Claims

ABSTRACT OF THE DISCLOSURE

The invention provides a body chassis construction for an automobile particularly an electric automobile using plastics formed sheets providing a double wall floor.

---

This invention relates to motor land vehicles especially but not exclusively electric motor driven cars and light vans, and its object is to provide a chassis or chassis and body construction which is particularly light in weight (thus conserving power and increasing range) and is robust, rigid and simple to manufacture particularly without employing expensive tools.

In accordance wtih a first aspect of the invention, a method of manufacturing a motor land vehicle chassis comprises forming first and second dished members and securing the two members together one within the other, characterised in that each member is made by drape-forming a thermoplastic synthetic resin.

The term "drape-forming" is meant to include shaping methods in which vacuum forming is one step. This uses inherently cheap moulds as compared to those used for injection moulding or other plastics forming techniques, and also avoids the requirement (in injection moulding of large components, for example chassis) of using large capacity moulding machines which can pre-heat and pressurise the necessary volume of plastics.

It is believed that polypropylene would be a suitable material for forming the member, this being pre-formed into large plates or sheets and then drape-formed. However, it is preferred to use ABS co-polymer especially the material sold under the trademark Royalex which comprises a sandwich of ABS and a foaming agent which is heat-activated.

The preferred method, so far as the drape forming is concerned, is therefore to pre-heat the ABS sandwich for the required time and temperature to foam the filler, which expands the sheet especially in thickness, and then drape the hot soft sheet on or in a mould and vacuum form. This allows deep drawing. To assist in production, both to speed the same and also give accurate forming, shaping dies may be pressed against the drape. When cool and set the member is transferred for assembly.

In the assembly step, the two formed sheets are placed together and secured as by adhesives or bonding agents. The two may be secured together about their peripheries and also elsewhere. Lugs and bores may be formed in the moulding step upon which components are subsequently mounted.

When the body and chassis are formed by these techniques, the complete vehicle may have at certain locations three parallel (or not) layers of the material, each comprising surface portions of ABS and solidified foam "sandwich filling" between the surface portions. This gives great strength and rigidity, and moreover, in the event of subsequent damage, for example in use of the vehicle if the surface is unbroken but merely dented (as is likely) gentle heat application will restore the original vacuum formed contours.

It is intended to form the body shell complete i.e. as a closed hollow body and subsequently cut along lines of indentation provided in the moulding step, to separate side and rear doors, provide window openings, and the like, and subsequently attach trims or finish components around the cut for example, sawn edges and mount other components, for example lamps in other of the openings thus provided. The doors will then be formed in a moulding step and again may be finished with trims, seals and the like, and also possibly lights, catches and the like, before being re-assembled to the body shell. Where substantial areas are unwanted, for example the space of a window opening, the material therein may be formed into other components, for example hub caps, in the original moulding step and subsequently sawn or cut out.

The two sheets making up the chassis comprise a lower one which forms the exterior of the vehicle, and an upper one which forms at least the floor of the vehicle and possibly also portions of the vehicle side-walls. All wheel axles and other shaped concavities or convexities are formed in the vacuum-forming step. Moreover, the plastics material may have grain or other surface finish imparted to it in the moulding, so as to reduce or eliminate trim work.

One presently preferred embodiment of the invention is now described by way of example and with reference to the accompanying drawings, wherein:

FIG. 8 is an exploded and partly broken away perspective view of the complete car;

FIG. 9 is an enlarged sectional perspective view of a mounting; and

Figure 1:
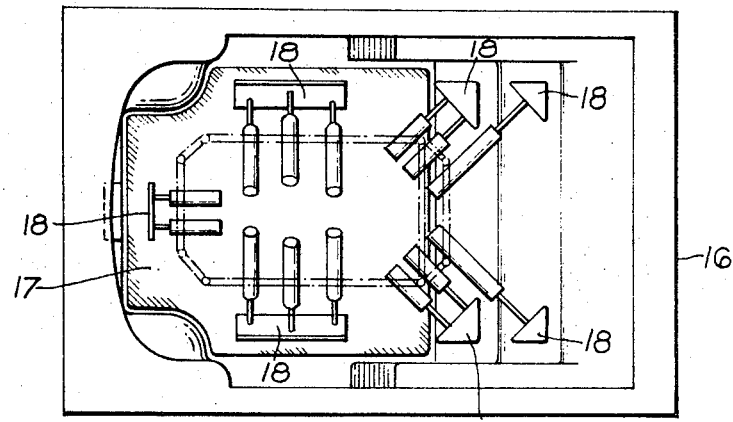
FIG. 1 is a diagrammatic plan view of a mould.
Figure 6:
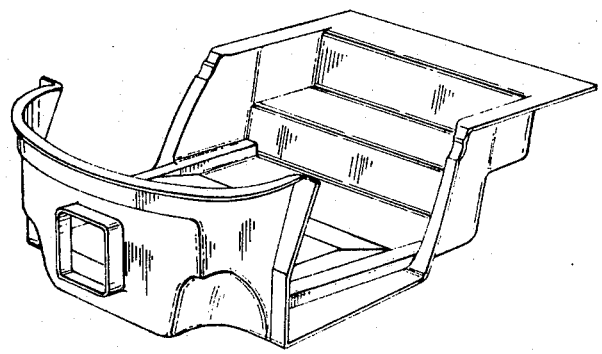
FIGS. 6 and 7 are views similar to FIG. 5 of other components of the car body.

Turning first to FIG. 1 a mould is shown in plan view: this mould is for forming the component of FIG. 6. Located above the mould but adapted to be positioned within the mould cavity (e.g. by being lowered therein) are sets of hydraulic or pneumatic rams coupled to shaping blocks, some only of these being shown in FIG. 1.

Figure 2:
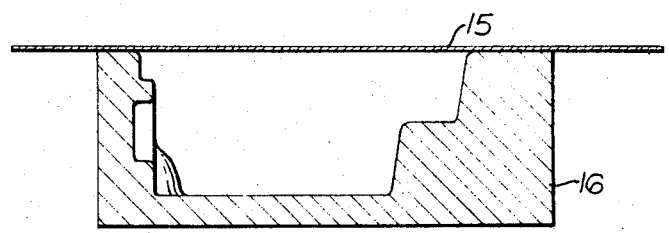
FIGS. 2–4 are diagrammatic sectional elevations of the mould showing three stages in forming a component.
Figure 3:
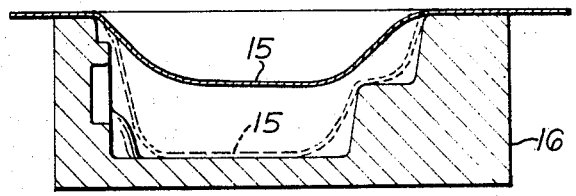
Figure 4:
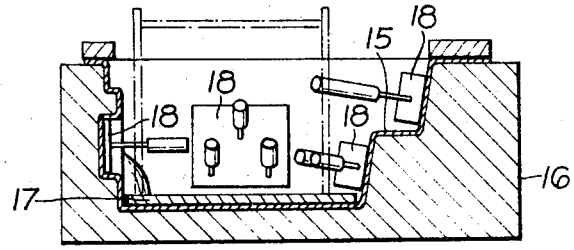

The general method is now described, starting with a sheet of Royalex (ABS copolymer) sandwich which has been heated in an oven to raise the ABS skins of the sandwich to a level of thermo-plasticity suitable for drape-forming, e.g. 320° F., and to heat activate the filler so as to foam and expand the latter. The sheet 15 is placed on the mould 16, FIG. 2, and sags to the full line position shown in FIG. 3. A first basal shaping block 17, is then lowered into the mould to press, or assist in drawing, the sheet to the bottom of the cavity as shown in broken line, FIG. 3. The further shaping blocks 18 are then ram displaced to conform the sheet to the mould contour especially in the corners, undercuts and the like. During part of the time the mould cavity has been open to atmosphere via flap valves and during at least part has been evacuated by a fan, so that vacuum contributes to the forming.

Certain areas of the sheet may be moulded to simulate leather or other material finish at least one one face prior to forming into the components.

The mould may be made of wood, metal or other materials, and the surface next to the cavity may be positively cooled to speed cooling and setting of the material in the mould-defined shape.

When the shape is cool and set, the rams are retracted, and the shape is removed from the mould, initially hinge-ing about the undercuts, if provided. Scrap portions of the sheet are then cut away, as by sawing, although in general any large area not required for the finished component will be used to form a separate part, as for example, a door, the tail-gate, hub-caps or the like.

Figure 5:
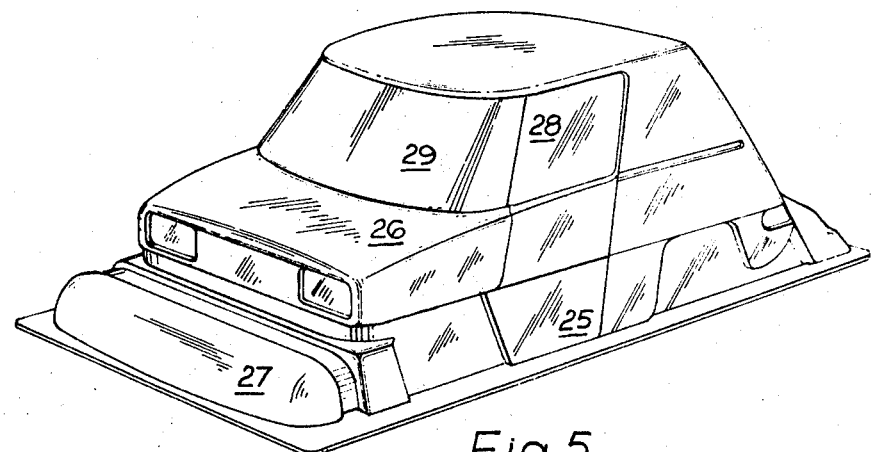
FIG. 5 is a perspective view of one formed component of a car body.
Figure 7:
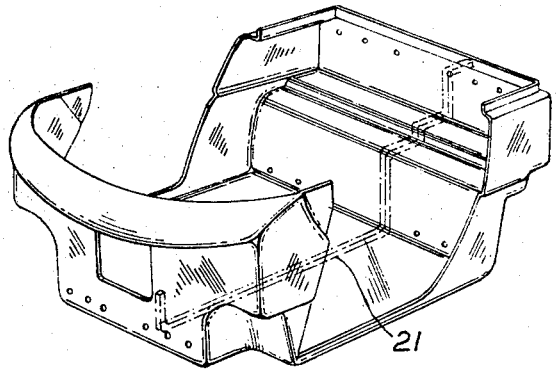

The components of FIGS. 5, 6, and 7, forming the complete body and chassis, are all formed similarly. The sheets used for the components are coloured as required, so that the finished assembled vehicle needs no painting, or trimming, or at least a minimum of these steps.

The component of FIG. 6 is assembled to the component of FIG. 7, to form a double-walled floor, rear quarters and front bulk-head sub-assembly. The vehicle illustrated is intended for electric traction, from electric storage batteries mounted in boxes provided at the front and rear, outside the passenger compartment of the vehicle (FIG. 8) and they, together with the necessary control switches are interconnected by bus-bar (not shown) which lie on the member of FIG. 7 and between that and the component of FIG. 6, following the line for example shown by reference 21 in FIG. 7. The material therefore serves to protect and insulate the heavy current carrying conductors of such a vehicle, but additionally the bus-bars are preferably held in place by a mat of fibre-glass or like reinforced resin laid over them and bonded to the lower component. The bus-bars then may add rigidity and strength to the complete chassis.

The components are secured together around their mating parts by adhesive preferably of the synthetic resinous kind such as an appropriate grade of Araldite (RTM).

In the case of the component of FIG. 5, portion 25 is cut away to form a door panel, portion 26 a bonnet, portion 27 an apron, and portions 28, 29 to leave gaps for windows and windscreen. Alternatively however, the roof and side walls may be individually made by the same (or other) techniques, and attached together to make the finished upper body part (as in FIG. 5), which overlaps the lower body parts of FIGS. 6 and 7, so that about the most vulnerable waist line of the vehicle three generally parallel spaced walls are provided as shown by the broken away portion of FIG. 8, this contributing to heat and sound insulation and to safety. However, in the event of damage as by impact in an accident, the material referred to (Royalex) is resilient to resist and recover from blows, but in the event of being dented, can be restored by the application of heat, unless the damage has actually broken the surface.

Figure 10:
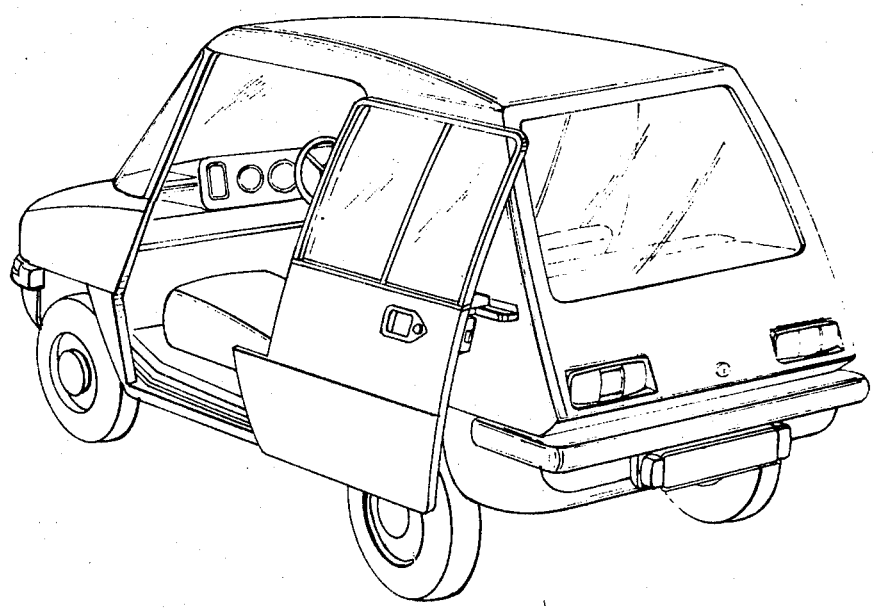
FIG. 10 is a perspective view of the complete car.

The steering, suspension, drive, electrical accessories, braking and other systems of the vehicle may all be conventional. In general it is possible to provide lugs or brackets on the components in the shaping and forming steps, upon which to bolt or screw other components. However we prefer to provide mounting points by means of disc like plugs of material having screw-threaded inserts therein, and spin weld to the Royalex sheet, by providing a hole in the latter slightly smaller than the plug, placing the plug in co-axial alignment with the hole, and rotating the plug so as to generate heat by friction and locally melt the ABS, whereupon the plug sinks in the hole until flush, and upon cessation of spinning fuses into position. FIG. 10 illustrates such a plug in position.

Whilst the foregoing description relates to the use of ABS sheets of a certain type, and made by a particular method, the same constructional features may be attained using components made of fibre glass reinforced resin for example, or mixtures that is components of both types and methods of manufacture, and moreover these may be combined with other types of components.

We claim:

1. A method of making a vehicle chassis comprising a vehicle floor and platform for components, comprising the steps of softening a thermoplastic synthetic resinous sheet by heating to render it pliable, placing the sheet on a mould cavity to permit the sheet to sag into the cavity, forcing the sheet into conformity with the corners of the mould cavity, cooling, removing the resulting member from the mould cavity, and securing the resulting member and another member of similar shape formed in the same manner, by means of an adhesive, one within the other.

2. The method claimed in claim 1 wherein each member is draped within a mould, and pushed into the mould contour by shaping blocks.

3. The method as claimed in claim 2 wherein the members are vacuum formed.

References Cited

UNITED STATES PATENTS

| 2,827,412 | 3/1958 | McKay | 156—212 |
| 3,271,222 | 9/1966 | Moorman | 156—212 |
| 3,382,124 | 5/1968 | Briskey | 156—212 |

CARL D. QUARFORTH, Primary Examiner

S. J. LECHERT, JR., Assistant Examiner

U.S. Cl. X.R.

156—245, 285, 293, 303.1